United States Patent
May, Jr. et al.

(10) Patent No.: US 9,979,765 B2
(45) Date of Patent: May 22, 2018

(54) ADAPTIVE CONNECTION SWITCHING

(71) Applicant: Apple Inc., Cupertino, CA (US)

(72) Inventors: William B. May, Jr., Sunnyvale, CA (US); John Y. Su, Sunnyvale, CA (US); Roger N. Pantos, Cupertino, CA (US); Hassan A. Shojania, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 127 days.

(21) Appl. No.: 14/709,149

(22) Filed: May 11, 2015

(65) Prior Publication Data
US 2016/0337428 A1    Nov. 17, 2016

(51) Int. Cl.
*H04L 29/06* (2006.01)
*H04L 12/803* (2013.01)

(52) U.S. Cl.
CPC ........ *H04L 65/4092* (2013.01); *H04L 47/122* (2013.01); *H04L 65/80* (2013.01); *H04L 69/14* (2013.01); *Y02B 60/33* (2013.01)

(58) Field of Classification Search
CPC .............................. H04L 69/16; H04L 67/142
USPC ......................................................... 709/219
See application file for complete search history.

(56) References Cited

U.S. PATENT DOCUMENTS

| | | | |
|---|---|---|---|
| 8,683,066 B2 | 3/2014 | Hurst et al. | |
| 8,868,772 B2 | 10/2014 | Major et al. | |
| 9,338,486 B2 * | 5/2016 | Phillips | H04N 21/238 |
| 2012/0311174 A1 | 12/2012 | Bichot et al. | |
| 2013/0185399 A1 | 7/2013 | Appleby et al. | |
| 2014/0143439 A1 * | 5/2014 | Ramamurthy | H04N 21/23439 709/231 |

FOREIGN PATENT DOCUMENTS

EP    2477397 A1    7/2012

* cited by examiner

*Primary Examiner* — Adnan Mirza
(74) *Attorney, Agent, or Firm* — Baker Hostetler LLP; Rober L. Hails

(57) ABSTRACT

A method of streaming media may include opening a single connection between a client device and a media source; requesting a first media segment of a media stream corresponding to selected tier of a media title over the single connection; determining a download bitrate of the single connection; comparing the download bitrate to a predetermined bitrate of the media title; and in response to determining that the download bitrate is less than the predetermined bitrate, opening a plurality of connections between the client device and media source. The predetermined bitrate may be a predetermined bitrate of a next higher bitrate tier in a group of tiers containing the selected tier when the selected tier is not a highest bitrate tier in the group, and a predetermined bitrate of the selected tier otherwise. The method may further include, in response to determining that an aggregate download bitrate of the plurality of connections is less than a multiple of a download bitrate of an individual one of the connections, closing some of the plurality of connections so that only the individual connection remains.

20 Claims, 5 Drawing Sheets

ADAPTIVE CONNECTION SWITCHING

BACKGROUND INFORMATION

Media streaming over the Internet is increasingly popular, but faces a variety of performance issues. One central problem involves maintaining a suitable transmission bandwidth in the face of dynamically changing network conditions.

In one scenario, a media source is connected to the Internet through a first service provider, a client device is connected through a second service provider, and the intervening network includes one or more transit points. Although transmission bandwidth between the media source and its service provider as well as between the client and its service provider may be sufficient to support streaming a requested media title at a desired quality level, one or more of the transit points through which the stream travels may be congested and represent a transmission bottleneck that limits the bandwidth between the media source and client device to below acceptable levels. Moreover, such congestion may be dynamic in nature, and need to be addressed repeatedly while streaming.

Therefore, a need exists for systems and methods to provide improved media streaming in the presence of network congestion.

BRIEF DESCRIPTION OF THE DRAWINGS

So that features of the present invention may be understood, a number of drawings are described below. However, the appended drawings illustrate only particular embodiments of the invention and are therefore not to be considered limiting of its scope, for the invention may encompass other equally effective embodiments.

DETAILED DESCRIPTION OF EXAMPLE EMBODIMENTS

An embodiment of a method of streaming media may include initially opening a single connection between a client device and a media source. The client may use the single connection to request a first media segment of a media stream corresponding to a selected tier of a media title, so as to avoid any delays in receiving the first segment and beginning playback. While receiving data over the single connection, the client may evaluate whether switching to a plurality of connections between the client and media source would result in a preferred streaming performance based on current network conditions. For example, the client may monitor a download bitrate of the single connection and compare this to either a designated bitrate of a next higher bitrate tier, if the selected tier is not the highest in a corresponding group of tiers, or to a designated bitrate of the selected tier if it is the highest. If the download bitrate is less than the bitrate of the next higher tier, or that of the selected tier if it is the highest, the client may determine that in view of current network conditions, a plurality of connections may provide a more desirable streaming performance than the single connection at both the selected and next higher tier, and open a plurality of connections between the client and media source. Otherwise, the client may remain at a single connection.

The client may then use the plurality of connections to request further media segments of the media stream at the preferred performance level. While receiving data over the plurality of connections, however, the client may continue to evaluate whether a single or a plurality of connections would result in preferred streaming performance in view of evolving network conditions. For example, the client may monitor an aggregate download bitrate of the plurality of connections and a download bitrate of an individual connection of the plurality, and compare the aggregate download bitrate to a multiple of the individual download bitrate. If the aggregate download bitrate is less than the multiple of the individual download bitrate, the client may determine that a single connection provides a sufficient streaming performance, and close a number of the plurality of connections so that only the individual connection remains. Otherwise, the client may remain at a plurality of connections. Switching back to a single connection when a plurality of connections does not provide a significant performance enhancement may provide benefits such as reduced overhead, reduced power consumption and reduce use of network resources.

Figure 1:
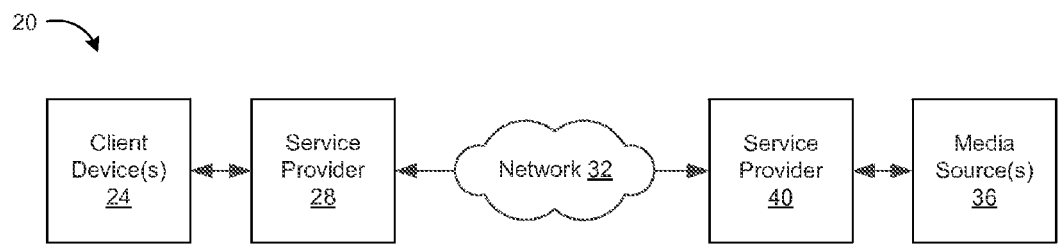
FIG. 1 is a schematic diagram depicting an embodiment of a media streaming system.

FIG. 1 depicts an embodiment of a media streaming system 20 for use in streaming media. The media streaming system 20 may include one or more client devices 24 connected to a communications network 32 (such as the Internet) via a first network service provider 28 (such as a first Internet Service Provider (ISP)), and one or more media sources 36 connected to the network 32 via a second network service provider 40 (such as a second ISP).

Figure 2:
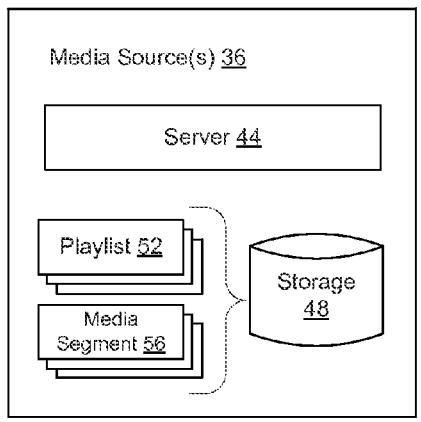
FIG. 2 is a schematic diagram depicting an embodiment of a media source of the media streaming system.

The media source 36 may provide one or more media streams to the client device 24 over components of the system 20 including the network providers 28, 40 and communications network 32. FIG. 2 depicts an embodiment of the media source 36. The media source 36 may include a server 44 to serve media streams to the client device 24, and a storage 40 to store media files such as playlist files 52 and media segment files 56.

Figure 3:
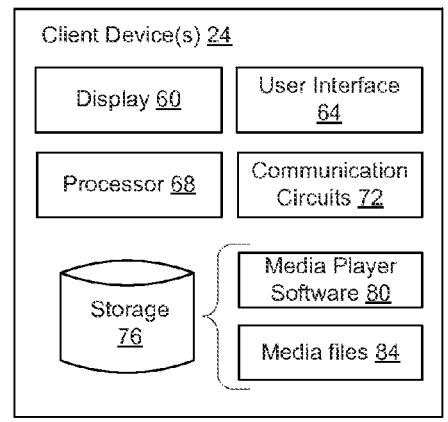
FIG. 3 is a schematic diagram depicting an embodiment of a client device of the media streaming system.

The client device 24 may provide a platform for a user to select, receive and display media streams from the media source 36. FIG. 3 depicts an embodiment of the client device 24. The client device 24 (or a combination of client devices) may include a display 60, a user interface 64, a processor 68, communication circuits 72, and a storage 76. The storage 76 may store media player software 80 and media files 84.

The media streamed from the media source 36 to the client device 24 may include a variety of different types of media, including one or more of video, audio, or presentations, etc. Each media title may be provided by the media source 36 to the client device 24 in one or more tier levels having selected properties. For example, a video title may be provided at a plurality of different tiers having different combinations of video resolutions, video encoding bitrates, and video frame rates, etc. Each tier of a media title may be represented by a corresponding different media stream.

Figure 4:
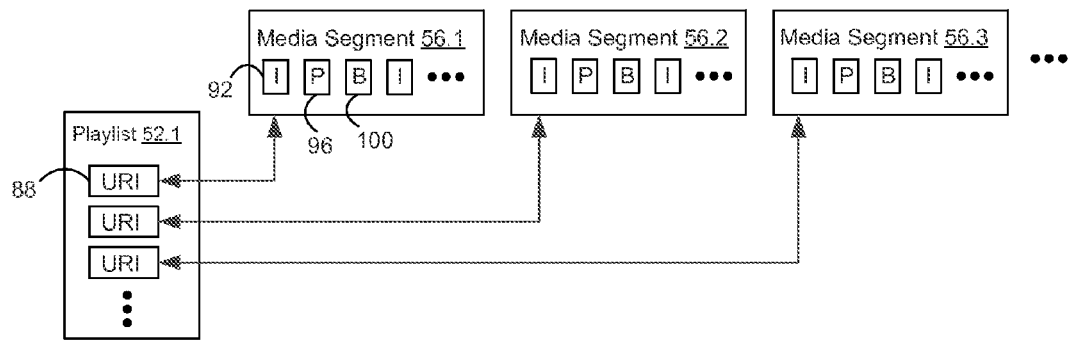
FIG. 4 is a schematic diagram depicting embodiments of a playlist file and media segment files that may be used by the media streaming system.

The media streaming system 20 may provide a media stream using one or more playlist files 52 and one or more media segment files 56. FIG. 4 depicts an embodiment of a playlist 52.1 and corresponding media segment files 56.1, 56.2, 56.3 . . . for use in providing a media stream including a video component. The playlist file 52.1 may include an ordered list of pointers 88, such as uniform resource indicators (URIs), that point to the media segment files 56.1, 56.2, 56.3 . . . or portions thereof. The media segment files 56.1, 56.2, 56.3 . . . may include media segments, i.e., media data, defining the video of the stream, and can each include data for one or more video frames of the video component of the stream, such as one or more of I-frames 92, P-frames 96 or B-frames 100.

Generally speaking, to provide a media stream, such as may correspond to a selected tier of a media title, from the media source 36 to the client device 24, one or more playlist files 52 corresponding to the stream may be transmitted from the media source 36 to the client device 24. The client device 24 may then request media segment files 56 or portions thereof corresponding to the media stream from the media source 36 using the ordered list of pointers 88 contained in the playlist file 52 to reference locations of the media segment files 56. The media source 36 may then serve the requested media segment files 56 or portions thereof to the client device 24 as the media stream.

The media streaming system 20 may optionally provide a media stream using one or more media files, such as media segments, having an organization or data structure other than as discussed above.

Figure 5:
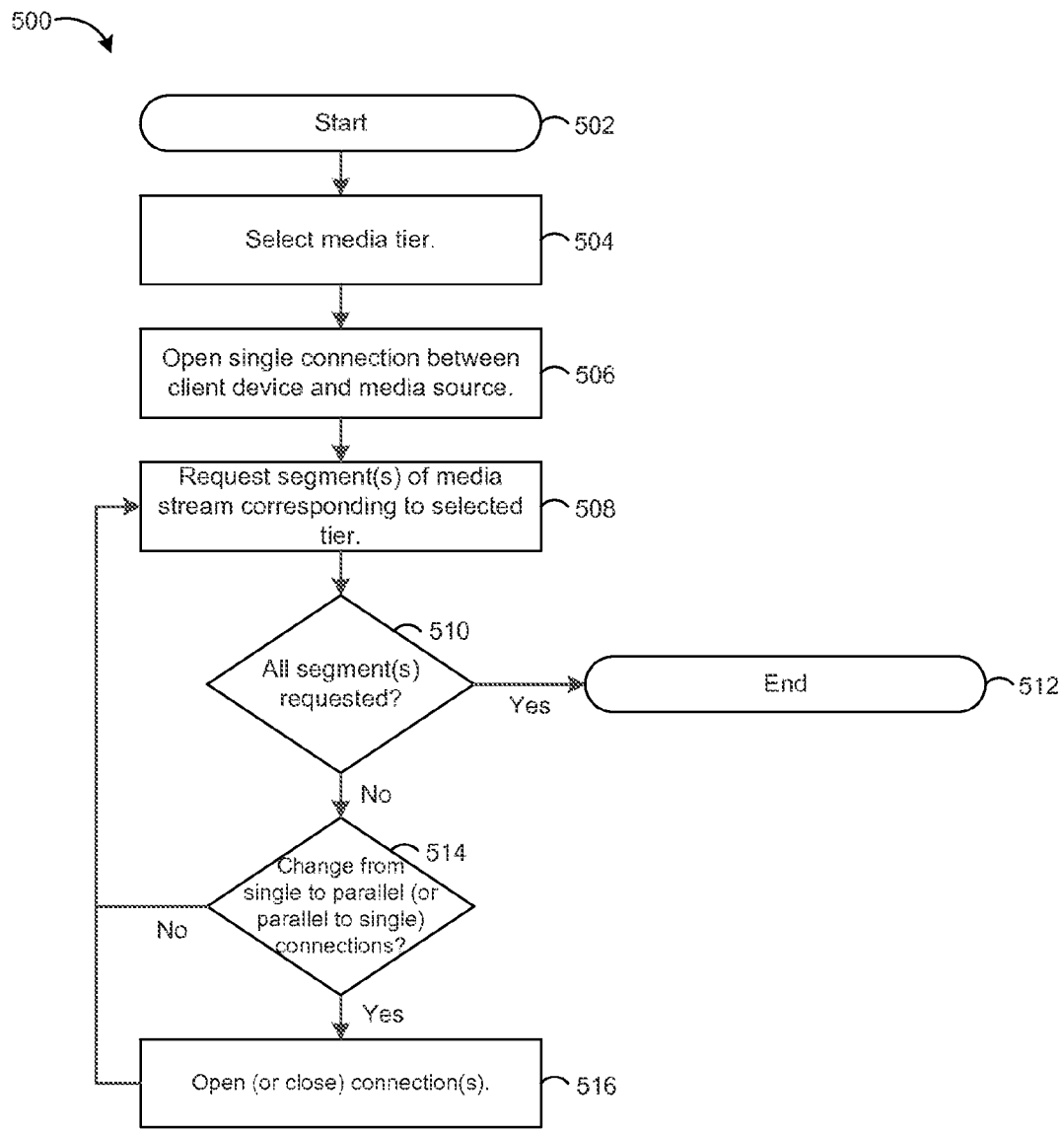
FIG. 5 is a flowchart depicting an embodiment of a method of streaming media from the media source to the client device.

The media streaming system 20 may provide dynamic switching of connections between the client device 24 and media source 36 to provide media streaming in a manner that may adaptively overcome transmission bottlenecks in the communications network 32 between the client device 24 and media source 36. FIG. 5 depicts an embodiment of a method 500 of streaming media from the media source 36 to the client device 24. The method 500 may begin at step 502.

A tier of a media title to be streamed may be selected at step 502. The tier may be selected from among a group of a plurality of tiers designated for the particular client device 24. The designated tier group may include tiers at different combinations of one or more of different video resolutions, video encoding bitrates and video frame rates, among other variable properties. A specific selected tier may include a specific combination of these properties, such as a specific video resolution, video encoding bitrate and video frame rate. In one example, a tier group designated for a client device 24 having a relatively smaller display, such as a smart phone or tablet, may include a plurality of tiers one of more different video encoding bitrates and/or video frame rates at a selected set of relatively smaller resolutions, while a tier group designated for a client device 24 having a relatively larger display, such as a desktop computer or television, may include a plurality of tiers at one or more different video encoding bitrates and/or video frame rates at a selected set of relatively larger resolutions. The selection of the tier may be performed by the client device 24 or media source. The selection may be performed automatically or may include user input.

A single data transmission connection may be opened between the client device 24 and the media source 36 at step 506. The single connection may provide transmission of data and control packets between the media source 36 and the client device 24 and between the client device 24 and the media source 36. The client device 24 may open or initiate opening of the single connection. In one embodiment the data transmission connection may be a Transmission Control Protocol (TCP) connection. A TCP connection may be opened at the request of the client device 24 by performing a handshake between the client device 24 and the media source 36. In other embodiments, the data transmission connection may be another type of connection, such as a User Data Protocol (UDP) connection.

One or more media segments 56, or portions thereof, of a media stream corresponding to the selected tier may be requested at step 508. The client device 24 may request the media segment 56 from the media source 36. In a first performance of step 508, following the initial opening of the single connection between the client device 24 and media source 36 at step 506, a first media segment 56 of the media stream is typically requested. As some client device media players 80 may require this first media segment 56 to be fully received before beginning playback of the media stream, requesting the first media segment 56 using a single connection may advantageously avoid any delay in receiving the media segment 56 that may be incurred if a plurality of connections were initially opened to request a plurality of media segments 56.

A determination of whether all segments 56, or at least all desired segments 56, of the media stream have been requested may be made at step 510. If it is determined that all segments 56 have been requested, the method 500 may end at step 512.

If it is determined that not all segments 56 have been requested at step 510, a determination of whether to switch between the single connection and a plurality of connections between the client device 24 and the media source 36 may be made at step 514. In a first performance of step 514, when only the single connection has been opened, it may be determined whether to switch from a single connection to a plurality of connections. The determination of whether to switch between a single connection and a plurality of connections may be made based on an evaluation of whether such a switch may provide desirable download bandwidth performance based on current network conditions, such as which may account for the effects of transmission bottlenecks. Embodiments of a method for evaluating whether to switch between a single connection and a plurality of connections are discussed below in connection FIG. 6.

If a determination is made to switch between a single connection and a plurality of connections at step 514, a number of connections between the client device 24 and media source 36 may be opened or closed at step 516. The client device 24 may open or close, or initiate opening or closing, of the connections. In a first performance of step 516, when only the single connection between the client device 24 and media source 36 has been opened, one or more connections between the client device 24 and media source 36 may be opened to create a plurality of connections. Each connection may provide a separate connection for transmission of data and control packets between media source 36 and client device 24 and between the client device 24 and media source 36. In one embodiment, the plurality of connections may each be a TCP connection. Each TCP connection may be separately opened at the request of the client device 24 by performing a handshake between the client device 24 and the media source 36. In other embodiments, the plurality of connections may each be a TCP, UDP or other type of separate connection.

Once additional connections have been opened or closed, the method 500 may return to step 508, where further media segments 56 may be requested. When a plurality of connections have been opened, one or more media segments 56 may be requested using each of the plurality of connections. The client device 24 may request the media segments 56 from the media source 36. For example, in one embodiment a second connection may be opened at step 516, one or more media segments 56 may be requested using the initial single connection and, one or more media segments 56 may also be requested using the second connection. In other embodiments, more than one additional connection may be opened at step 516.

Using a plurality of connections between the client device 24 and media source 36 may increase data transmission performance in the presence of some types of data transmission bottlenecks experienced by the network 32. For example, one type of network congestion may render all or most connections between the client device 24 and media source 36 relatively slow. In such cases, although each connection may provide only a relatively small data transmission bandwidth between the client device 24 and media source 36, the data transmission bandwidth provided by the connections may be additive, and an overall data transmission bandwidth between the client device 24 and the media source 36 may be increased by using a plurality of such connections.

A determination of whether all segments 56 have been requested may be again made at step 510, and if so the method 500 may end at step 512.

If it is determined that not all segments 56 have been requested, a determination of whether to switch between a single connection and a plurality of connections may again be made at step 514. When a plurality of connections have been opened, it may be determined whether to switch from the plurality of connections back to a single connection. The determination of whether to switch back to a single connection may again be made based on an evaluation of whether such a switch may provide desirable download bandwidth performance based on current network conditions. Embodiments of a method for evaluating whether to switch back to a single connection from a plurality of connections are discussed below in connection FIG. 7.

If a determination is made to switch back to a single connection at step 514, at least some of the plurality of connections between the client device 24 and media source 36 may be closed at step 516 to leave only a single connection remaining. The client device 24 may close or initiate closing of the connections. Each TCP connection may be separately closed at the request of the client device 24 by performing a handshake between the client device 24 and the media source 36.

Once only a single connection remains, the method 500 may again return to step 508, where at least one media segment 56 may be requested using the single connection. The method 500 may continue to iteratively cycle through the steps discussed above, potentially switching between single and parallel connections any number of times, as may be dictated by network conditions, until the media stream or desired portion thereof has been received.

In one embodiment, instead of or in addition to adaptively switching between a single and a plurality of connections, the method 500 may adaptively switch between different pluralities of connections by correspondingly increasing or decreasing the number of connections at step 516.

In another embodiment, the method 500 may optionally determine to select a different tier of the media title and subsequently begin requesting media segments of the media stream associated with the newly selected tier.

Figure 6:
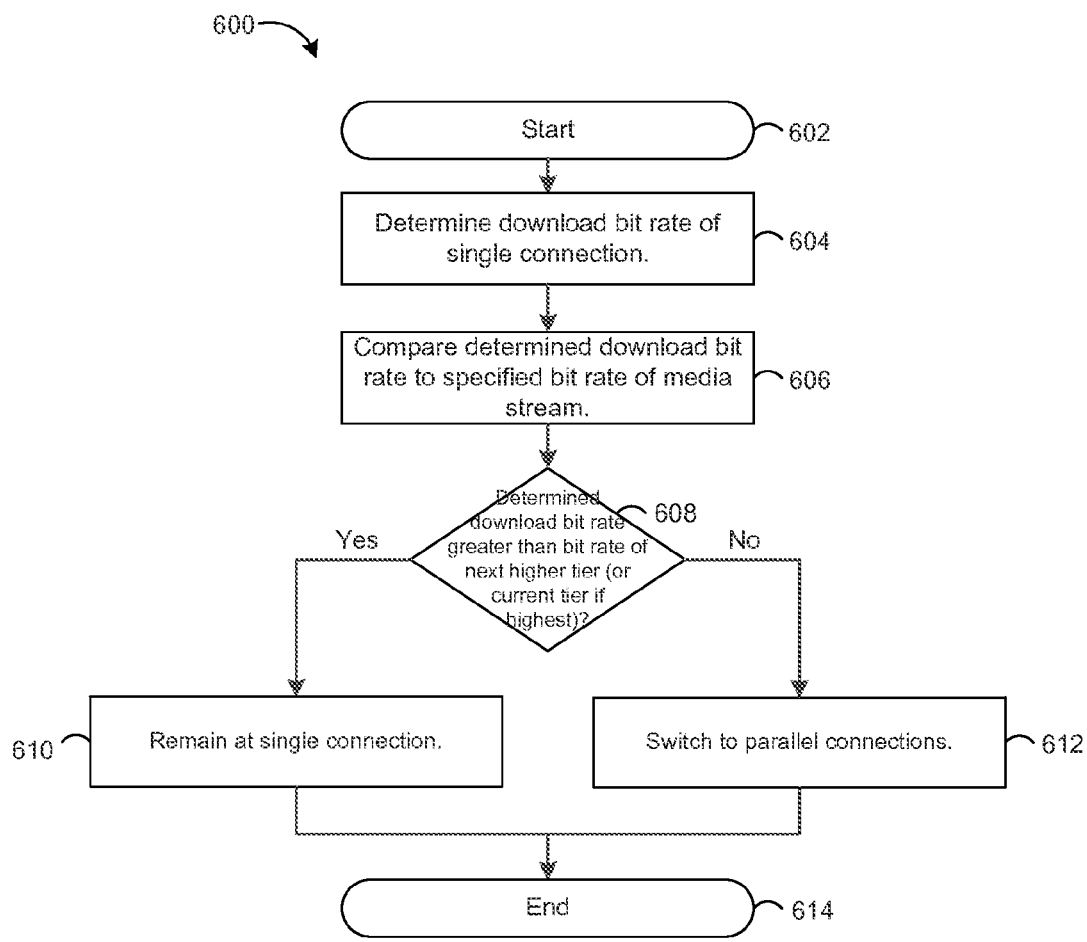
FIG. 6 is a flowchart depicting an embodiment of a method of evaluating whether to switch from a single connection to a plurality of connections between the media source to the client device.

As discussed above, a determination of whether to switch from a single connection to a plurality of connections may be made based on an evaluation of whether such a switch may provide desirable download bandwidth performance based on current network conditions. FIG. 6 depicts an embodiment of a method 600 of evaluating whether to switch from a single connection to a plurality of connections. The method 600 may begin at step 602.

The download bitrate of the single open connection may be determined at step 604. The download bitrate may be the amount of data received by the client device 24 from the media source 36 over the single connection per period of time. The client device 24 may determine the download bitrate of the single connection. For example, the client device 24 may monitor the data received by the single connection over a period of time to determine the download bitrate. In another embodiment, the media source 36 may determine the download bit rate of the single connection and communicate the determined download bitrate to the client device 24.

The download bitrate of the single connection may be compared to a predetermined bitrate of the media title at step 606. Each tier of the media title may have a corresponding predetermined bitrate which may be a designated download bitrate required or recommended to download the tier. In one embodiment, the predetermined bitrate of a given tier may correspond to the video encoding bitrate used to encode the media segments 56 of the media stream of that tier. The client device 24 may determine the predetermined bitrate for a given tier from, e.g., the media files such as from a corresponding playlist file 88. The predetermined bitrate to which the determined download bitrate of the open single connection is compared may depend on the selected tier. If the selected tier is not the tier with the highest predetermined bitrate within the group of tiers from which the selected tier was chosen, then the predetermined bitrate may be that of the tier in the group with the next highest predetermined bitrate in comparison to the selected tier. If the selected tier is the highest bitrate tier within the group of tiers, then the predetermined bitrate may be that of the selected tier. The client device 24 may perform the comparison.

A determination of whether the download bitrate of the single connection is greater than the predetermined bitrate of the media title may be made at step 608. If it is determined that the download bitrate of the single connection is greater than the predetermined bitrate of the media title, a decision to remain at a single connection between the client device 24 and media source 36 may be made at step 610. The decision to remain at a single connection may thus reflect an evaluation that the single connection provides sufficient performance at both the current selected tier and the next higher bitrate tier in the group of tiers based on current network conditions, and thus a switch to a plurality of connections may not be warranted.

If it is determined that the download bitrate of the single connection is not greater than the predetermined bitrate of the media title, a decision to switch to a plurality of connections from a single connection may be made at step 612. The decision to switch to a plurality of connections may reflect an evaluation that the single connection does not provide sufficient performance at both the current selected tier and the next higher tier in the group of tiers based on current network conditions, and thus a switch to parallel connections may be warranted.

The method 600 may end at step 614.

In one embodiment, the method 600 may include an optional preliminary step of determining whether the download bitrate is less than a predetermined percentage of an expected or specified bandwidth of a connection between the client device 24 and the first network service provider 28. If the download bit rate is below the predetermined percentage of the expected or specified bandwidth of the connection between the client device 24 and the first network service provider 28, steps of the method 600 may be performed to evaluate whether to switch form a single connection to a plurality of connections. If the download bit rate is above the predetermined percentage of the expected or specified bandwidth of the connection between the client device 24 and the first network service provider 28, other steps of the method 600 may be omitted and a decision to remain at a single connection made.

Figure 7:
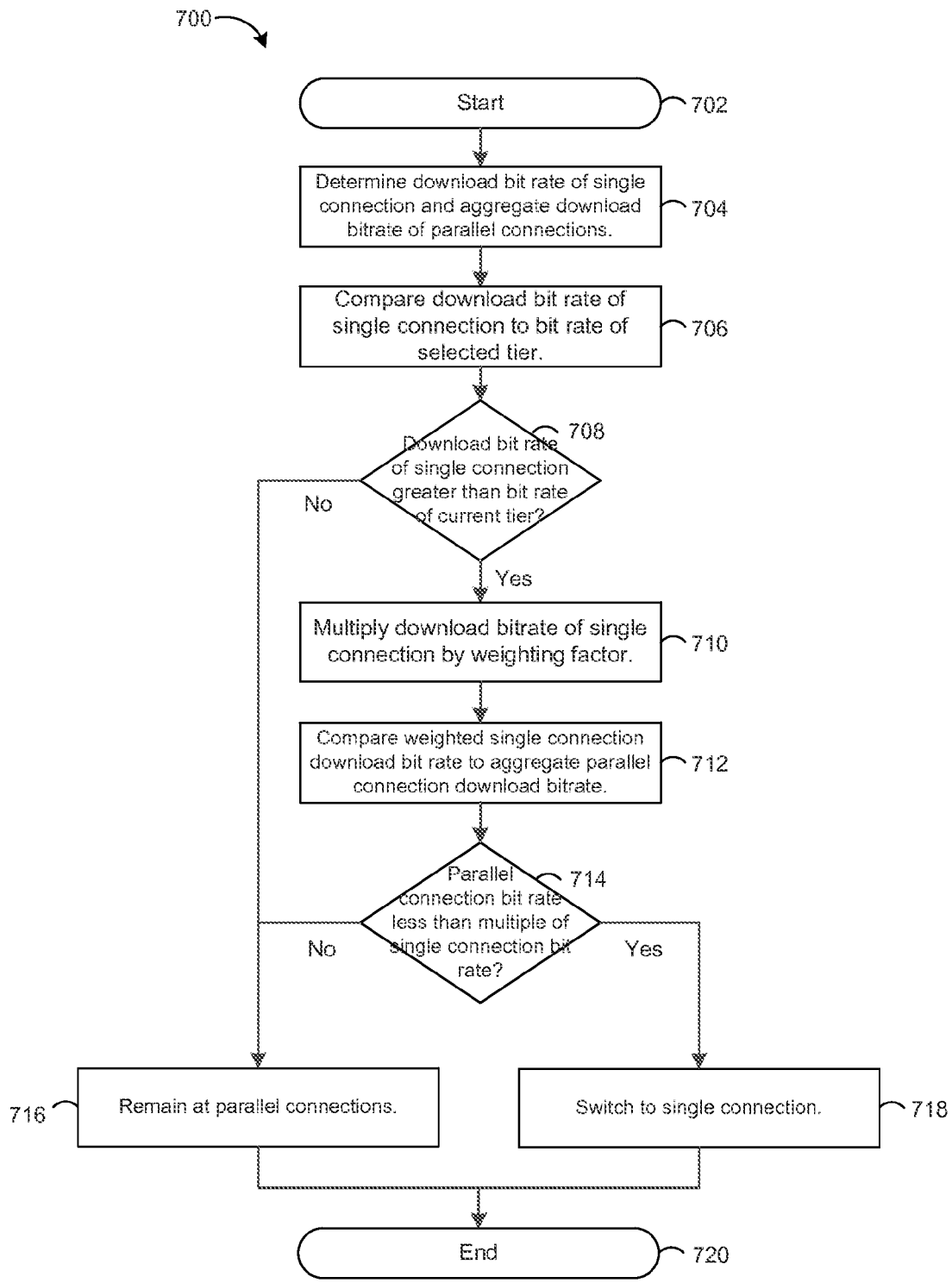
FIG. 7 is a flowchart depicting an embodiment of a method of evaluating whether to switch from a plurality of connections to a single connection between the media source to the client device.

As discussed above, a determination of whether to switch from a plurality of connections to a single connection may be made based on an evaluation of whether such a switch may provide desirable download bandwidth performance based on current network conditions. FIG. 7 depicts an embodiment of a method 700 of evaluating whether to switch from a plurality of connections to a single connection. The method 700 may begin at step 702.

The download bitrate of at least one individual connection of the plurality of connections as well as the aggregate download bitrate of the plurality of connections may be determined at step 704. The client device 24 may determine the download bitrate the individual connections of the plurality of connections in a manner similar to determining the download bitrate of the single connection as discussed above in regard to step 604 of method 600. The aggregate download bitrate of the plurality of connections may be determined as a sum of download bitrates of the individual connections in the plurality of connections.

The download bitrate of the individual connection may be compared to the predetermined bitrate of the selected tier at step 706. The client device 24 may perform the comparison.

A determination of whether the download bitrate of the individual connection is greater than the predetermined bitrate of the selected tier may be made at step 708. If it is determined that the download bitrate of the individual connection is not greater than the predetermined bitrate of the selected tier, a decision to remain at a plurality of connections between the client device 24 and media source 36 may be made at step 716. The decision to remain at a plurality of connections may reflect an evaluation that the plurality of connections provides sufficiently better performance at the selected tier than would the individual connection based on current network conditions, and thus a switch back to a single connection in the form of the individual connection may not be warranted.

If it is determined that the download bitrate of the individual connection is greater than the predetermined bitrate of the selected tier, then the method 700 may proceed to step 710.

Note that, in one embodiment, the download bitrate of each or a plurality of the individual connections of the plurality of connections may be compared to the aggregate download bitrate of the plurality of connections at step 706; a determination of whether the download bitrates of any of the individual connection is greater than the predetermined bitrate of the selected tier may be made at step 708; and a decision of whether to remain at a plurality of connections at step 716 or to proceed to step 710 may be made based on whether the download bitrates of any of the individual connections is greater than the predetermined bitrate of the selected tier.

The download bitrate of the individual connection may be multiplied by a weighting factor at step 710. The multiplying may be performed by the client device 24. The weighting factor may be selected from a plurality of predetermined weighting factors or dynamically set during a performance of the method. The weighting factor may be set to a value greater than 1, such as 1.5, 2, or another value.

The weighted download bitrate of the individual connection may be compared to the aggregate download bitrate of the plurality of connections at step 712. The client device 24 may perform the comparison.

A determination of whether the aggregate download bitrate of the plurality of connections is greater than the weighted download bitrate of the individual connection may be made at step 714. If it is determined that the aggregate download bitrate of the plurality of connection is greater than the weighted bitrate of the individual connection, a decision to remain at a plurality of connections between the client device 24 and media source 36 may be made at step 716. The decision to remain at a plurality of connections may reflect an evaluation that the plurality of connections provides sufficiently better performance at the selected tier than would the individual connection based on current network conditions, and thus a switch to a single connection in the form of the individual connection may not be warranted.

If it is determined that the aggregate download bitrate of the plurality of connection is less than the weighted bitrate of the individual connection, a decision to switch to the individual connection as a single connection between the client device and media source may be made at step 718. The decision to switch to the individual connection as a single connection may reflect an evaluation that the plurality of connections does not provide sufficiently better performance at the selected tier than would the individual connection based on current network conditions, and thus a switch to a single connection in the form of the individual connection may be warranted. Switching back to a single connection when a plurality of connections does not provide a significant performance enhancement may provide benefits such as one or more of a reduced overhead, reduced power consumption and reduced use of network resources.

In an alternative embodiment, the aggregate download bitrate of the plurality of connections may be multiplied by a respective weighting factor at step 710, where such a weighting factor may be less than one, such as 0.75, 0.25 or another value; and the download bitrate of the individual connection may be compared to the weighted aggregate download bitrate of the plurality of connections at step 712. Essentially the same determinations and decisions may then be made at steps 714-718.

The method 700 may end at step 720.

In embodiments in which, instead of or in addition to adaptively switching between a single and a plurality of connections the method may adaptively switch between different pluralities of connections by increasing or decreasing the number of connections at step 516, as discussed above, the methods 600 and 700 may correspondingly evaluate whether to increase or decrease the number of connections instead of evaluating whether to switch between a single and a plurality of connections.

Embodiments of the methods 500, 600, 700 discussed herein may be combined with rotating connections between the client device 24 and media source 36. A given connection between the client device 24 and media source 36 may be rotated by closing the connection and opening a different connection in its place. In embodiments of the methods 500, 600, 700 discussed herein, the single connection may be rotated by closing the single connection and opening a different single connection in its place, and one or more of the individual connections of the plurality of connections may be rotated by closing that individual connection and opening a different individual connection in its place.

Figure 8A:
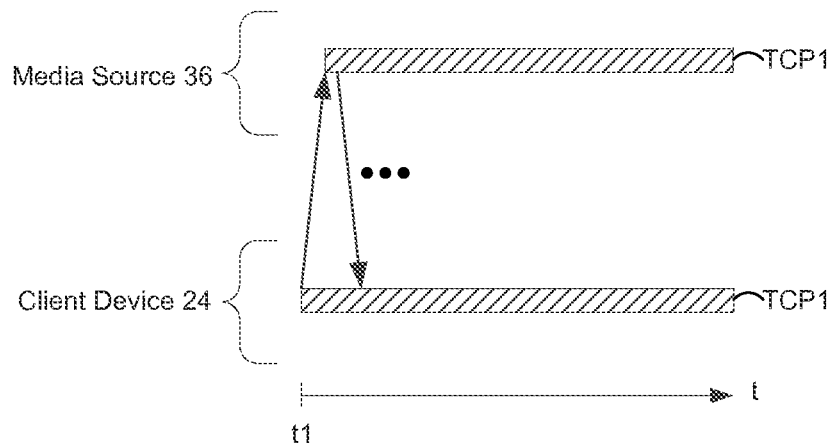
FIGS. 8A-8C are timing diagrams depicting embodiments of connections between the media source to the client device.
Figure 8B:
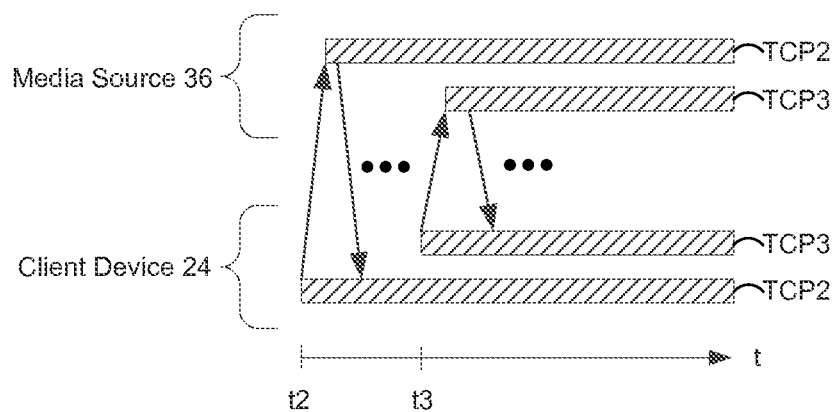
Figure 8C:
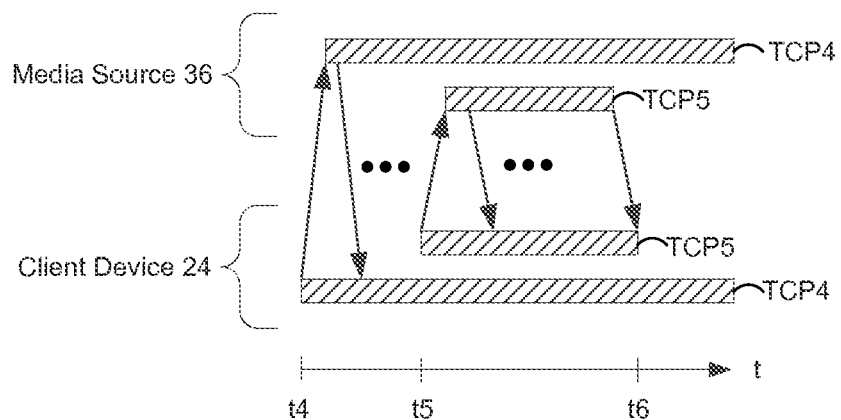

FIGS. 8A-8C depict embodiments of timing diagrams for performances of aspects of the methods 500, 600, 700 of FIGS. 5-7. In FIG. 8A, a single TCP connection TCP1 is opened between the client device 24 and the media source 36 starting at time t1, and the media source 36 provides the media stream to the client device 24 by remaining at a single connection throughout based on the evaluations discussed above. In FIG. 8B, a single TCP connection TCP2 is opened between the client device 24 and the media source 36 starting at time t2, and then a second TCP connection TCP3 is opened between the client device 24 and the media source 36 starting at time t3, to collectively provide the media stream to the client device 24, based on the evaluations discussed above. In FIG. 8C, a single TCP connection TCP4 is opened between the client device 24 and the media source 36 starting at time t4, a second TCP connection TCP5 is opened between the client device 24 and the media source 36 starting at time t5, and then the second connection TCP5 is closed at time t6, to provide the media stream to the client device 24, based on the evaluations discussed above.

Embodiments of the client device 24 may include a non-transitory machine readable medium, such as, e.g., the storage 76, to store program instructions, such as in the form of, e.g., the media player software 80, which when executed by the processor 68 perform embodiments of the methods 500, 600, 700 discussed herein.

Embodiments of the client device 24 may be a portable electronic device, such as a smartphone, tablet or laptop, or a relatively less portable electronic device, such as a desktop computer, television or set top television device, that include the processor 68, which may be configured to execute program instructions, such as in the form of, e.g., the media player software 80, to perform embodiments of the methods 500, 600, 700 discussed herein.

Additional embodiments of the media streaming system 20 and methods 500, 600, 700 of streaming media and/or operating the media streaming system 20 are possible. For example, any feature of any of the embodiments of the media streaming system 20 or methods 500, 600, 700 of streaming media and/or operating the media streaming system 20 described herein can optionally be used in any other embodiment of the media streaming system 20 or methods 500, 600, 700 of streaming media and/or operating the media streaming system 20. Also, embodiments of the media streaming system 20 and methods 500, 600, 700 of streaming media and/or operating the media streaming system 20 can optionally include any subset of the components or features of the media streaming system 20 and methods 500, 600, 700 of streaming media and/or operating the media streaming system 20 described herein.

What is claimed is:

1. A method of streaming media, comprising:
   opening a single connection between a client device and a media source;
   requesting a first media segment of a media stream corresponding to selected tier of a media title over the single connection;
   determining a download bitrate of the first media segment over the single connection;
   comparing the download bitrate to a predetermined bitrate corresponding to another tier of the media title;
   in response to determining that the download bitrate is less than the predetermined bitrate, opening a plurality of connections between the client device and media source; and
   requesting a first plurality of media segments of the media stream over a first connection of the plurality of connections and a second plurality of media segments of the media stream over a second connection of the plurality of connections.

2. The method of claim 1, wherein the predetermined bitrate is (i) a predetermined bitrate of a next higher bitrate tier in a group of tiers containing the selected tier when the selected tier is not a highest bitrate tier in the group, and (ii) a predetermined bitrate of the selected tier otherwise.

3. The method of claim 1, further comprising, in response to determining that the download bitrate is greater than the predetermined bit rate, remaining with the single connection between the client device and media source.

4. The method of claim 1, further comprising:
   determining a download bitrate of an individual connection of the plurality of connections and an aggregate download bitrate of the plurality of connections;
   determining whether the aggregate download bitrate is greater than a multiple of the individual download bitrate; and
   in response to determining that the aggregate download bitrate is less than the multiple of the individual download bitrate, closing some of the plurality of connections so that only the individual connection remains between the client device and media source.

5. The method of claim 4, further comprising, in response to determining that the aggregate download bitrate is greater than the multiple of the individual bitrate, keeping the plurality of connections between the client device and media source open.

6. The method of claim 4, wherein the determining of whether the aggregate download bitrate is greater than the multiple of the individual download bitrate includes multiplying at least of the individual download bitrate or the aggregate download bitrate by a predetermined factor.

7. The method of claim 1, wherein the single connection is a single transmission control protocol (TCP) connection, and the plurality of connections are a plurality of different TCP connections.

8. The method of claim 1, further comprising selecting the tier from a group of tiers, wherein the group of tiers includes a plurality of different tiers of the media title designated for the client device.

9. The method of claim 1, wherein a group of tiers correspond to a group of different combinations of at least one of: video resolutions of the media stream, video encoding bitrates of the media stream, or video frame rates of the media stream.

10. A non-transitory machine-readable medium including program instructions that, when executed by a processor, perform a method of streaming media, the method comprising:
- opening a single connection between a client device and a media source;
- requesting a first media segment of a media stream corresponding to selected tier of a media title over the single connection;
- determining a download bitrate of the first media segment over the single connection;
- comparing the download bitrate to a predetermined bitrate corresponding to another tier of the media title;
- in response to determining that the download bitrate is less than the predetermined bitrate, opening a plurality of connections between the client device and media source; and
- requesting a first plurality of media segments of the media stream over a first connection of the plurality of connections and a second plurality of media segments of the media stream over a second connection of the plurality of connections.

11. The non-transitory machine-readable medium of claim 10, wherein the predetermined bitrate is (i) a predetermined bitrate of a next higher bitrate tier in a group of tiers containing the selected tier when the selected tier is not a highest bitrate tier in the group, and (ii) a predetermined bitrate of the selected tier otherwise.

12. The non-transitory machine-readable medium of claim 10, the method further comprising, in response to determining that the download bitrate is greater than the predetermined bit rate, remaining with the single connection between the client device and media source.

13. The non-transitory machine-readable medium of claim 10, the method further comprising:
- determining a download bitrate of an individual connection of the plurality of connections and an aggregate download bitrate of the plurality of connections;
- determining whether the aggregate download bitrate is greater than a multiple of the individual download bitrate; and
- in response to determining that the aggregate download bitrate is less than the multiple of the individual download bitrate, closing some of the plurality of connections so that only the individual connection remains between the client device and media source.

14. The non-transitory machine-readable medium of claim 13, the method further comprising, in response to determining that the aggregate download bitrate is greater than the multiple of the individual bitrate, keeping the plurality of connections between the client device and media source open.

15. The non-transitory machine-readable medium of claim 10, wherein the single connection is a single transmission control protocol (TCP) connection, and the plurality of connections are a plurality of different TCP connections.

16. An electronic device, comprising:
a processor configured to control the electronic device to:
- open a single connection between the electronic device and a media source;
- request a first media segment of a media stream corresponding to selected tier of a media title over the single connection;
- determine a download bitrate of the first media segment over the single connection;
- compare the download bitrate to a predetermined bitrate corresponding to another tier of the media title;
- in response to determining that the download bitrate is less than the predetermined bitrate, open a plurality of connections between the client electronic device and media source; and
- request a first plurality of media segments of the media stream over a first connection of the plurality of connections and a second plurality of media segments of the media stream over a second connection of the plurality of connections.

17. The electronic device of claim 16, wherein the predetermined bitrate is (i) a predetermined bitrate of a next higher bitrate tier in a group of tiers containing the selected tier when the selected tier is not a highest bitrate tier in the group, and (ii) a predetermined bitrate of the selected tier otherwise.

18. The electronic device of claim 16, wherein the processor is configured to control the electronic device to, in response to determining that the download bitrate is greater than the predetermined bit rate, remain with the single connection between the electronic device and media source.

19. The electronic device of claim 16, wherein the processor is configured to control the electronic device to:
- determine a download bitrate of an individual connection of the plurality of parallel connections and an aggregate download bitrate of the plurality of connections;
- determine whether the aggregate download bitrate is greater than a multiple of the individual download bitrate; and
- in response to determining that the aggregate download bitrate is less than the multiple of the individual download bitrate, close some of the plurality of so that only the individual connection remains between the electronic device and media source.

20. The electronic device of claim 19, wherein the processor is configured to control the electronic device to, in response to determining that the aggregate download bitrate is greater than the multiple of the individual bitrate, keep the plurality of connections between the electronic device and media source open.

* * * * *